United States Patent
Zhao et al.

(10) Patent No.: US 7,657,912 B2
(45) Date of Patent: Feb. 2, 2010

(54) METHOD, DEVICE AND SYSTEM FOR MANAGING CONTENTS OF VOD SERVICES

(75) Inventors: Wenpeng Zhao, Shenzhen (CN); Yongxiong Liao, Shenzhen (CN); Zhi Gao, Shenzhen (CN); Yong Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/552,988

(22) Filed: Sep. 2, 2009

(65) Prior Publication Data

US 2009/0313667 A1    Dec. 17, 2009

Related U.S. Application Data

(63) Continuation of application No. PCT/CN2007/071329, filed on Dec. 26, 2007.

(30) Foreign Application Priority Data

Mar. 2, 2007    (CN) .................. 2007 1 0079692

(51) Int. Cl.
*H04N 7/173* (2006.01)
(52) U.S. Cl. .............. 725/93; 725/91; 725/92; 725/115; 725/116
(58) Field of Classification Search .......... 725/87, 725/91, 92, 93, 98, 100, 114, 115, 116, 117; 709/203, 219; 370/486
See application file for complete search history.

(56) References Cited

U.S. PATENT DOCUMENTS

| | | |
|---|---|---|
| 5,600,573 A | 2/1997 | Hendricks et al. |
| 5,920,700 A | 7/1999 | Gordon et al. |
| 6,184,878 B1 | 2/2001 | Alonso et al. |
| 6,543,053 B1 | 4/2003 | Li et al. |

(Continued)

FOREIGN PATENT DOCUMENTS

CN    1332551    1/2002

(Continued)

OTHER PUBLICATIONS

International Search Report mailed Apr. 3, 2008 in International PCT Application No. PCT/CN2007/071329.

(Continued)

*Primary Examiner*—John Miller
*Assistant Examiner*—John Schnurr
(74) *Attorney, Agent, or Firm*—Finnegan, Henderson, Farabow, Garrett & Dunner LLP

(57) ABSTRACT

A method for managing contents of Video On Demand (VOD) services, where a Middle Ware (MW) controls the stored contents on a VOD server according to the VOD service information correlated with a channel is provided. The corresponding device and system are also provided. Therefore, the specific service forms are separated from the stored contents, and the MW controls the contents in a centralized manner according to the service information; the VOD server does not need to store the contents of each service separately, but adds and deletes the stored contents according to the unified control from the MW, thus avoiding repeated storage of the same data for different services.

20 Claims, 7 Drawing Sheets

U.S. PATENT DOCUMENTS

| | | | |
|---|---|---|---|
| 6,859,839 | B1 | 2/2005 | Zahorjan et al. |
| 7,003,793 | B2 | 2/2006 | Hwang et al. |
| 7,188,357 | B1 | 3/2007 | Rieschl et al. |
| 7,493,647 | B2 | 2/2009 | White et al. |
| 2001/0056578 | A1 | 12/2001 | Hwang et al. |
| 2004/0268410 | A1* | 12/2004 | Barton et al. ............... 725/119 |
| 2005/0005300 | A1* | 1/2005 | Putterman et al. ............. 725/89 |
| 2005/0022242 | A1* | 1/2005 | Rosetti et al. ................. 725/58 |
| 2005/0050577 | A1 | 3/2005 | Westbrook et al. |
| 2007/0124781 | A1* | 5/2007 | Casey et al. ................... 725/94 |
| 2007/0143809 | A1* | 6/2007 | Chen et al. .................. 725/119 |
| 2008/0022347 | A1* | 1/2008 | Cohen ........................ 725/134 |

FOREIGN PATENT DOCUMENTS

| | | |
|---|---|---|
| CN | 1339920 | 3/2002 |
| EP | 0735765 | 10/1996 |
| EP | 0963116 | 12/1999 |
| WO | WO 02/080550 | 10/2002 |
| WO | WO 2005/125203 | 12/2005 |

OTHER PUBLICATIONS

First Office Action issued in Chinese Application CN 2007100796923.

English translation of First Office Action of the State Intellectual Property Office of the PRC in Chinese Application No. 2007100796923, dated Dec. 5, 2008.

* cited by examiner

METHOD, DEVICE AND SYSTEM FOR MANAGING CONTENTS OF VOD SERVICES

This application is a continuation of PCT International Application No. PCT/CN2007/071329, filed Dec. 26, 2007, which claims a priority from the Chinese Patent Application No. 200710079692.3, filed with the Chinese Patent Office on Mar. 2, 2007 and entitled "Method, Device and System for Providing VOD Services and Managing Contents Thereof", the contents of both of these applications are hereby incorporated herein by reference in their entirety.

TECHNICAL FIELD

The present disclosure relates to interactive television technologies, and in particular, to a method for managing contents of Video On Demand (VOD) services, a method for providing VOD services, and relevant devices and systems.

BACKGROUND

With the development of the information communication technology, traditional analog television is replaced by Digital Television (DTV) and Internet Protocol Television or Interactive Personal Television (IPTV). Compared with traditional television, IPTV and DTV can provide various VOD services for flexible use.

Currently, a VOD service system is composed of a VOD server, an Electronic Program Guide (EPG) system, a Middle Ware (MW), and a Set-Top Box (STB) serving as a terminal. The VOD server is responsible for providing the program contents corresponding to various VOD service modes; the EPG system demonstrates the program contents and relevant services; the STB updates the EPG in the EPG system and provides the EPG for the user, and sends requests for using various VOD services as instructed by the user; the MW provides a service management and integration platform so that multiple "capability" components such as VOD server, EPG authentication server, and authorization and encryption system work on a unified platform.

A VOD service system in the prior art provides the following VOD services:

Time-Shifted Television (TSTV) or Pause Live Television (PLTV): This service allows the user to play back a live television program in a time window of a specific length; in the process of watching a live television program, the user may play back the program through a fast rewind key; TSTV imposes a specific time limit, called "time window", on playing back. Generally, the operator sets the time window to 0.5-1 hour. When the program is played back to the start time of the window, no further rewinding is allowed and the normal play resumes. If the program is played in fast forward mode to the end of the window, the current channel is closed automatically, and the live channel is activated.

True Video on Demand (TVOD): This service allows the user to watch a program played in a past time segment; the operator generally records the programs played on a channel selectively, or records the whole channel according to the play time segment and provides the programs in a list for the user; the user may demand a specific program or the programs in a specific time segment as required. The recorded contents are generally retained for 1 day to 1 month.

Network Personal Video Recorder (nPVR): This service allows the user to reserve recording of a future program and watch the recorded program at any time in the future; the operator may define certain channels for providing nPVR services and display the future EPG of such channels to the user, and the user may select a future program to be recorded; when it is time to live cast the program, the VOD server starts recording and saving the media file; the user may demand and watch the programs recorded by the operator anytime within the maximum retention period specified by the operator, and the watching process is similar to that of TVOD. Moreover, the nPVR service may be independent of the EPG. When the user is watching a live program, the user may choose to record the program anytime.

In the technical solution in the prior art, all the foregoing three services are provided by the VOD server.

To implement the TSTV service, the VOD server generally records a live channel with the time shifting capability cyclically according to a set time window. When the user performs time shifting, the live mode is changed to the VOD mode; upon completion of time shifting, the live mode resumes.

For TVOD services, the VOD server uses an independent file for recording the programs. Upon expiry of the file, the contents are deleted directly.

For nPVR services, the VOD server records the programs independently to generate every media file according to the subscription request of the user, and the media files are managed by each user.

However, the prior art suffers from at least the following defects: The storage of the VOD service contents and the provision of the VOD service mode are both undertaken by the VOD server, and one service corresponds to a type of stored contents; consequently, the content management is decentralized and some contents are stored repeatedly. For example, if the CCTV1 channel is defined as a time-shifted channel, the VOD server may retain the files in a specific time segment of the channel as time-shifted recorded files; if the "News Broadcasting" program (which is broadcast from 19:00 to 19:30) on this channel supports TVOD, the program broadcast from 19:00 to 19:30 may also be saved as another file; finally, if a user uses News Broadcasting as an nPVR content, the system may record and retain another file for the user; therefore, in the worst circumstances, the same content corresponding to three services is stored repeatedly in three files. In a VOD service, the expense of storage accounts for a high proportion. However, the prior art is unable to manage or utilize storage properly.

BRIEF SUMMARY

Embodiments of the present disclosure provide a method for managing contents of VOD services and a method for providing VOD services, and the relevant devices and systems, thus separating the specific service forms from the stored contents and avoiding repeated storage of the same data for different services.

A method for managing contents of Video on Demand (VOD) services in a centralized manner in an embodiment of the present disclosure includes:

delivering, by a Middle Ware (MW), a storage control indication of a channel to a VOD server according to VOD service information correlated with the channel; and, storing, by the VOD server, content of the channel according to the storage control indication, or, performing operation, by the VOD server, on a stored content of the channel according to the storage control indication.

A Video on Demand (VOD) service Middle Ware (MW) provided in an embodiment includes: a service packaging unit, adapted to define a VOD service, and correlate VOD service information with a channel; a storage control unit, adapted to deliver a storage control indication of the channel to a VOD server according to the VOD service information correlated by the service packaging unit for the channel.

A Video on Demand (VOD) server includes: a control interface unit, adapted to receive a storage control indication delivered by a VOD service Middle Ware (MW); and a control executing unit, adapted to store content of the channel according to the storage control indication or perform operation a stored content of a channel according to the storage control indication.

Moreover, a system for managing contents of Video on Demand (VOD) services in an embodiment of the present disclosure includes: a VOD service Middle Ware (MW), adapted to deliver a storage control indication of a channel according to VOD service information correlated with the channel; and a VOD server, adapted to store content of the channel according to the storage control indication or perform operation on a stored content of the channel according to the storage control indication.

In some embodiments of the present disclosure, the MW controls the stored contents for the VOD server according to the VOD service information correlated with the channel. Therefore, the specific service forms are separated from the stored contents, and the MW controls the contents in a centralized manner according to the service information; the VOD server does not need to store the contents of each service separately, but adds and deletes the stored contents according to the unified control from the MW, thus avoiding repeated storage of the same data for different services.

The present disclosure is hereinafter described in detail with reference to embodiments and accompanying drawings.

DETAILED DESCRIPTION OF THE EMBODIMENTS

Embodiments of the present disclosure provide a method for managing contents of VOD services, where an MW controls the stored contents on the VOD server according to the VOD service information correlated with a channel. Accordingly, embodiments of the present disclosure provide a method for providing VOD services as well as the relevant devices and systems, as detailed below.

Embodiment 1

Figure 1:
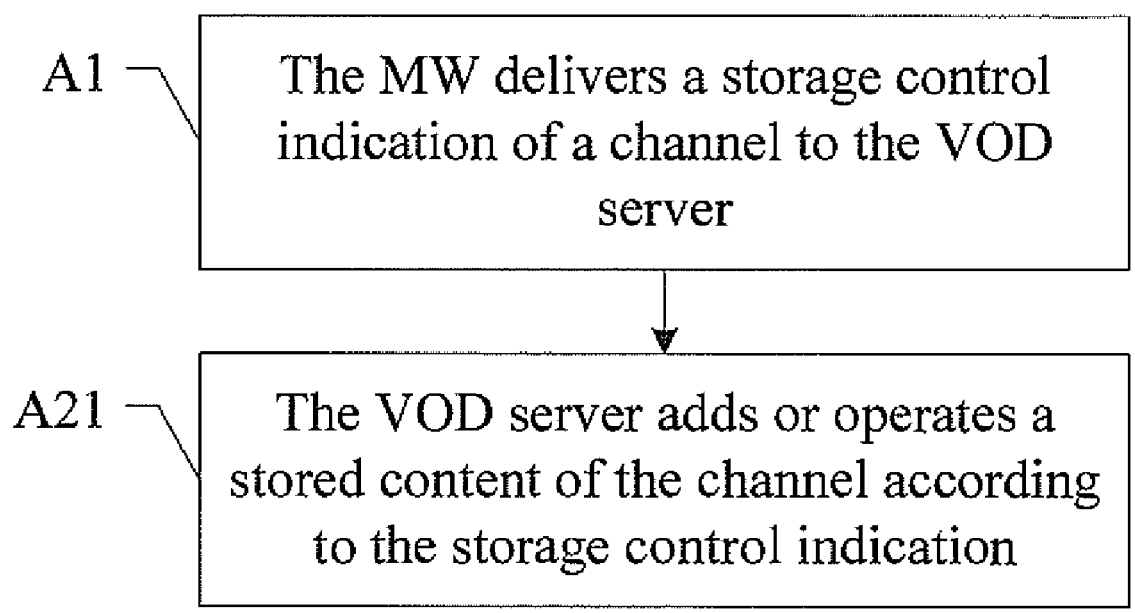
FIG. 1 is a flowchart of a method for managing contents of VOD services according to the first embodiment of the present disclosure.

As shown in FIG. 1, a method for managing contents of VOD services includes:

A1. A MW delivers a storage control indication of a channel to the VOD server according to the VOD service information correlated with the channel.

In this embodiment, the MW may use the VOD server as a capability component that provides the recording, playing and distributing functions; the MW delivers a storage control indication correlated with a stored content of the channel to the VOD server directly according to the requirement of the VOD service available from the channel, without delivering service information to the VOD server. If the content requirement changes due to adjustment of the VOD service correlated with the channel, the MW may control the VOD server to adjust the stored content through a storage control indication, which is much more flexible than the prior art where the program contents are recorded and deleted by the VOD server according to the EPG and service type.

A2. The VOD server stores content of the channel according to the storage control indication or performs operation on the stored content of the channel according to the storage control indication.

The VOD server does not need to understand different services, but only needs to record or perform operation on the contents according to the indication of the MW, thus simplifying the interface between the VOD server and the MW; the channel contents recorded by the VOD server are available to different VOD services concurrently. On this basis, the MW may provide other service forms through packaging. The contents of different services are stored in a uniform way, thus eliminating the possibility of storing the same content in multiple copies repeatedly for different services. That is, the VOD server may store a content of a program available from the same channel separately, and the separately stored content of the program may be invoked by multiple different services. Nevertheless, if a content is reproduced in multiple copies and stored in different locations for the purpose of backing up the content or accessing the content at a nearer location, it is not covered by "repeated storage" mentioned herein.

Figure 2:
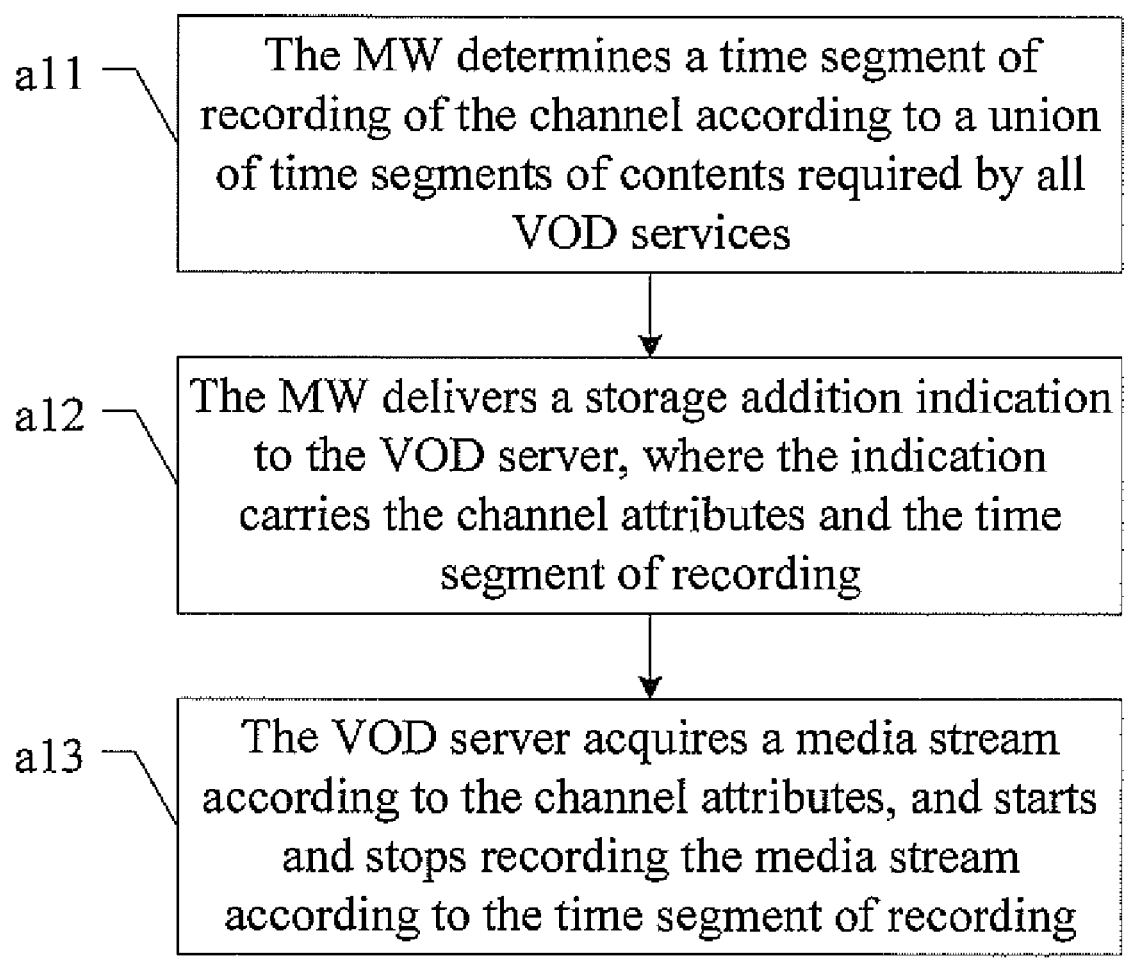
FIG. 2 shows a process of controlling and executing addition of a stored content according to the first embodiment of the present disclosure.

The storage control indication delivered by the MW comes in the following two types:

Storage addition indication: The control and execution steps of the storage addition indication are shown in FIG. 2, including:

a11. The MW determines the time segment of recording the contents on the channel according to the union of the time segments required for recording the contents of all VOD services correlated with the channel.

For example, as shown in Table 1, channel 1 provides both a TVOD service and an nPVR service; supposing the TVOD service needs to a VOD service in program 1 and program 2 and a user has subscribed to the nPVR service in program 1:

TABLE 1

| Channel | Service | Service Content | Retention Period |
|---------|---------|-----------------|------------------|
| Channel 1 | TVOD | Program 1: 8:00-9:00<br>Program 2: 9:00-10:00 | 1 month |
| Channel 1 | nPVR | Program 1: 8:00-9:00 | Specified by the user, maximally 6 months |

The MW then determines that the time segment of recording the content on channel 1 is "8:00-10:00" according to the VOD service requirement correlated with channel 1.

Particularly, the time segment of recording may be endless. For example, for a TSTV service, the user may demand playback at any time. Therefore, for the channel that provides the TSTV service, the recording is continuous, and an endless time segment of recording may be represented by an empty end time or special identifier.

In the foregoing example, a time segment of recording is indicated by a time start and end point. In practice, a time segment of recording may also be indicated by an EPG directly. For example, the time segment of recording of channel 1 is "program 1, program 2". In this case, the EPG of the channel needs to be distributed to the VOD server; when the program scheduling of the channel is adjusted, the adjustment needs to be notified to the VOD server. The foregoing two modes of indicating a time segment of recording have their respective strengths: In the first mode, the VOD server does not understand the data of the program, but only sees the channel and time information of the channel. If the program scheduling is changed, the MW may change accordingly through a control indication, thus simplifying and standardizing the interface between devices; in the second mode, the user-oriented service is generally provided in the form of an EPG therefore, if the control indication is delivered in the similar mode, it is more visual for the MW to perform judgment and operation.

a12. The MW delivers a storage addition indication to the VOD server, where the indication carries the channel attributes and the time segment of recording.

The main objective of the MW delivering the channel attributes is to enable the VOD server to know which live channel needs start of recording. The channel attributes may include part or all of the following contents:

channel ID such as channel name or serial number;

connection information, for example, frequency of the live channel (as far as DTV is concerned), service ID (as far as DTV is concerned), or multicast address that provides a live channel media stream (as far as IPTV is concerned), and multicast port (as far as IPTV is concerned); and media attributes, for example, bit rate of playing a recorded file, supportable multipliers of the fast forward speed and fast rewind speed, and format of a media file.

For a definite live channel, the foregoing contents of channel attributes are relatively stable. Therefore, the MW may deliver the detailed contents of the channel attributes to the VOD server immediately after defining the channel attributes, without waiting for delivering the contents together with the storage addition indication. In this way, when the MW delivers the storage addition indication, the channel attributes only need to include the channel ID such as channel name or serial number.

a13. According to the channel attributes in the storage addition indication, the VOD server acquires the media stream of the channel, and starts and stops recording the media stream of the channel according to the time segment of recording in the storage addition indication.

If the MW delivers a storage addition indication at the same time of delivering the detailed channel attributes, the VOD server may acquire the media stream directly according to the channel attributes; if the MW indicates only the channel ID, the VOD server may search for the corresponding channel attribute information to acquire the media stream.

In the specific recording process, the VOD server may retain the content at regular or irregular intervals. The retention mode depends on the media attributes set in the channel attributes. Generally, if the VOD server does not understand the EPG, the file may be stored at regular intervals. For example, the contents of one hour or half an hour are stored as a file. If the VOD server understands the EPG the file may be stored according to the EPG. The recorded file may be stored in a storage device inside or outside the VOD server.

Figure 3:
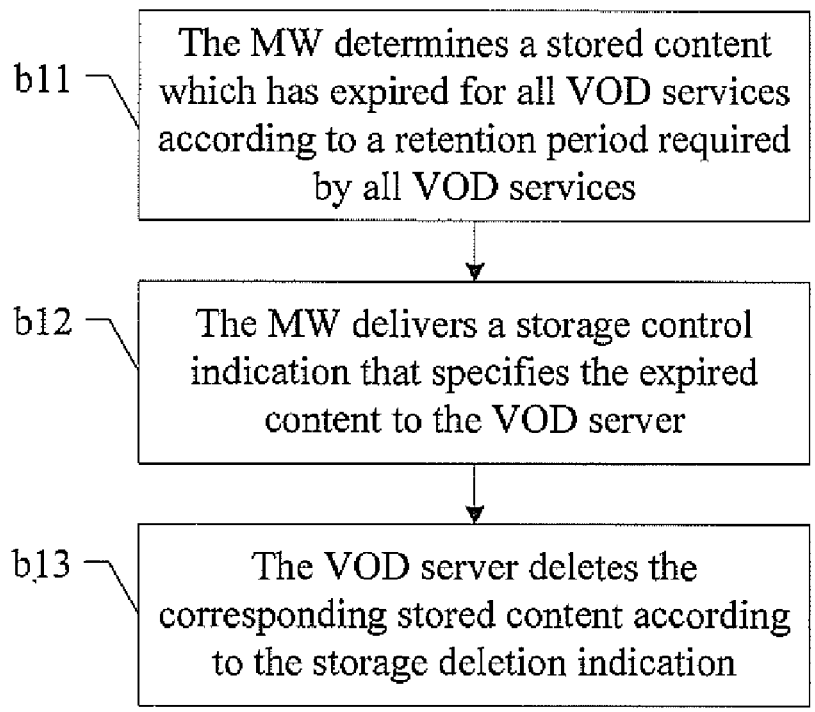
FIG. 3 shows a process of controlling and executing deletion of a stored content according to the first embodiment of the present disclosure.

(ii) Storage deletion indication: The control and execution steps of the storage deletion indication are shown in FIG. 3, including:

b11. According to a retention period required by all VOD services correlated with a stored content of the channel, the MW determines the stored content which has expired for all VOD services.

The MW may record the maximum retention period required by all VOD services correlated with the content. If the period of retaining the content exceeds the maximum retention period, it indicates that the content has expired for all services. For example, if a content is correlated with both the TSTV service and the TVOD service, because the retention period of the TVOD service is longer than that of the TSTV service, the MW judges whether the content has expired according to the retention period of the TVOD service.

Some services such as nPVR require an irregular retention period, where the retention period of the content is determined according to the user command in a certain time period. In this case, the MW waits until the retention period of the content for the service is determined, for example, until a deletion or cancellation indication is received from the user, or the maximum retention period is exceeded, and then judges whether the stored content has expired.

The MW judges expiry of the stored content with reference to the EPG of the channel. The EPG of the channel corresponds to the stored content. Therefore, the MW may judge whether the corresponding stored content has expired by recording the state of the EPG being invoked by various services. The MW may record the state of each EPG being invoked by the VOD service. For example, if channel 1 supports the TVOD service for 5 days, the record shows that each EPG of this channel is invoked by the TVOD service for 5 days; upon expiry of 5 days, the TVOD cancels invocation of the EPG Likewise, if channel 1 supports time shifting, the MW records the length of the time shifting window of the EPG being invoked by the TSTV service, When the EPG is invoked by no service, the stored content corresponding to the EPG is determined as expired, b12, The MW delivers a storage deletion indication to the VOD server, where the indication specifies the stored content determined in the foregoing step.

This embodiment does not limit the mode of specifying the stored content to be deleted, and any mode understandable to the VOD server is appropriate. For example, the MW may indicate the channel ID and time segment of recording corresponding to the stored content to be deleted. If the MW understands the file storage mode of the VOD server, the MW may indicate the distinctive ID (for example, filename or serial number) of the stored content directly.

In practice, if the VOD server understands the EPG and stores the content according to the EPG, it is operable for the MW to specify the expired stored content directly according to the state of the EPG being invoked by the service; if the VOD server does not understand the EPG or the VOD server stores the content according to the time slice instead of the EPG, the object to be specified depends on further judgment. For example, supposing channel 1 has the following EPGs:

EPG 1: "Children program, 17:00-19:00"

The MW delivers a storage addition indication to control the stored content added by the VOD server, namely, "channel 1, 17:00-18:00" corresponding to the program. If EPG 1 is invoked by no service, the foregoing stored content may be determined as expired, and it is appropriate whether the MW specifies the time segment or the stored content itself. The correspondence between the stored content and the EPG may also be not unique. For example, supposing the EPG of channel 1 is:

EPG 2: "Sports program, 16:00-17:30"
EPG 3: "Children program, 17:30-19:00"

The stored content "channel 1, 17:00-18:00" corresponds to multiple EPGs. If EPG 1 is invoked by no service but EPG 2 is still invoked by a service, the stored content may be specified in two modes: (1) if the MW understands the content storage mode of the VOD server, the MW analyzes the specific object and determines that the stored content "channel 1, 17:00-18:00" has not expired, and hence does not specify the content; (2) if the MW does not understand the content storage mode of the VOD server, the MW specifies the time segment of the expired content.

b13. The VOD server deletes the corresponding stored content according to the storage deletion indication.

Corresponding to step b12, the VOD server understands the specification of the stored content in the way consistent with the MW, and deletes the corresponding content. For the last scenario enumerated in step b12, if the MW specifies the time segment of the expired content directly, the VOD server analyzes the specific object, or regards the stored content as partially expired and deletes the content of the expired part; or determines the stored content as currently not expired and records the relevant specification first, and deletes the content when it is specified as totally expired, which depends on the specific mode of the VOD server storing the channel content.

Embodiment 2

A method for managing contents of VOD services. This embodiment is the same as the first embodiment except that: in the control and execution of storage addition in the first embodiment, the storage addition indication delivered by the MW may be understood as a recorded task schedule that carries the information such as the object to be recorded and start and end time, and the VOD server records and stores the content in the specified time segment according to the indication of the task schedule; by contrast, in the second embodiment, the recording of the channel content is controlled through instant commands.

Figure 4:
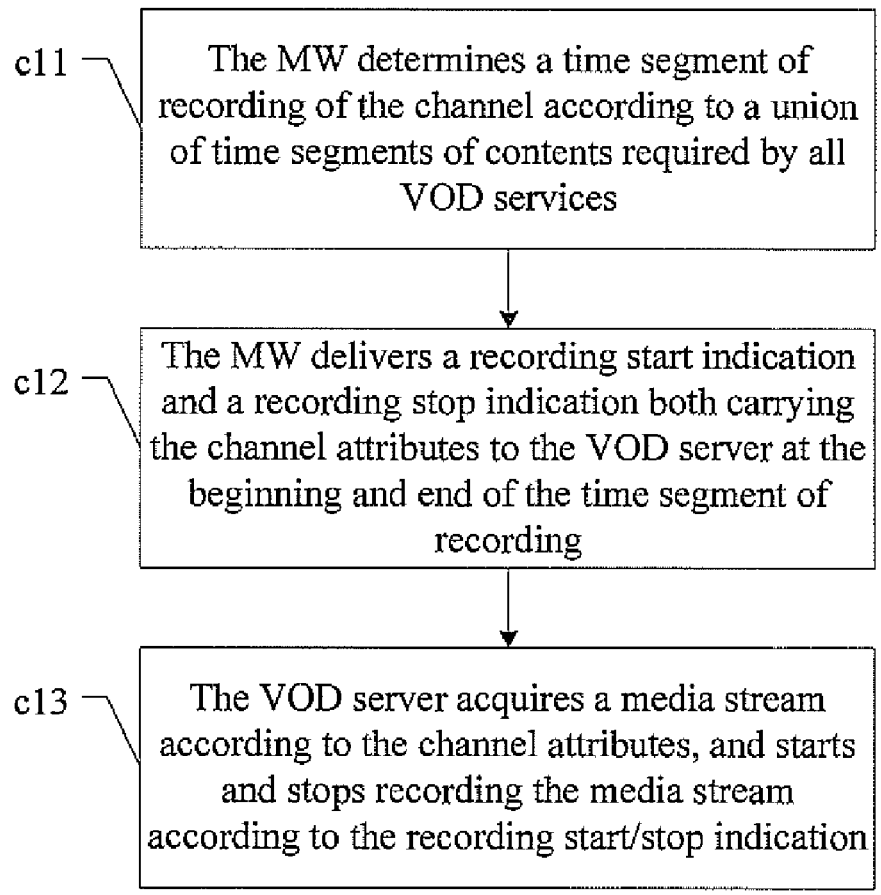
FIG. 4 shows a process of controlling and executing addition of a stored content according to the second embodiment of the present disclosure.

In this embodiment, the storage control indication that is delivered by the MW and controls the storage addition carries: a recording start indication and a recording stop indication. As shown in FIG. 4, the control and execution steps include:

c11. The MW determines the time segment of recording of the channel according to the union of the time segments of the contents required by all VOD services correlated with the channel.

This step may be performed with reference to step a11 in the first embodiment.

c12. The MW delivers a recording start indication and a recording stop indication both carrying the channel attributes to the VOD server at the beginning and end of the time segment of recording.

The two control indications delivered in this step adopt the control mode of instant execution. Similarly to the first embodiment, if the VOD server already stores the complete channel attributes of the live channel, the control indication may carry only the corresponding channel identifier. A special scenario is: the MW may deliver the complete attributes of the live channel as a recording start indication, namely, start recording the live channel while defining the live channel, which is suitable for controlling the live channel that requires continuous recording without the end time of recording, for example, controlling the live channel correlated with the TSTV service.

c13. According to the channel attributes, the VOD server acquires the media stream of the channel, and starts and stops recording the media stream of the channel according to the recording start indication and recording stop indication.

This step may be performed with reference to step a13 in the first embodiment except that the start and stop of recording are triggered by the instantly delivered indication.

Embodiment 3

A method for managing contents of VOD services. The control and execution of storage addition and storage deletion may be performed with reference to the method in the first or second embodiment. This embodiment differs from the foregoing two embodiments in that: a process of controlling and executing storage conversion is added, thus making the content operation more flexible and making the storage utilization more reasonable.

Figure 5:
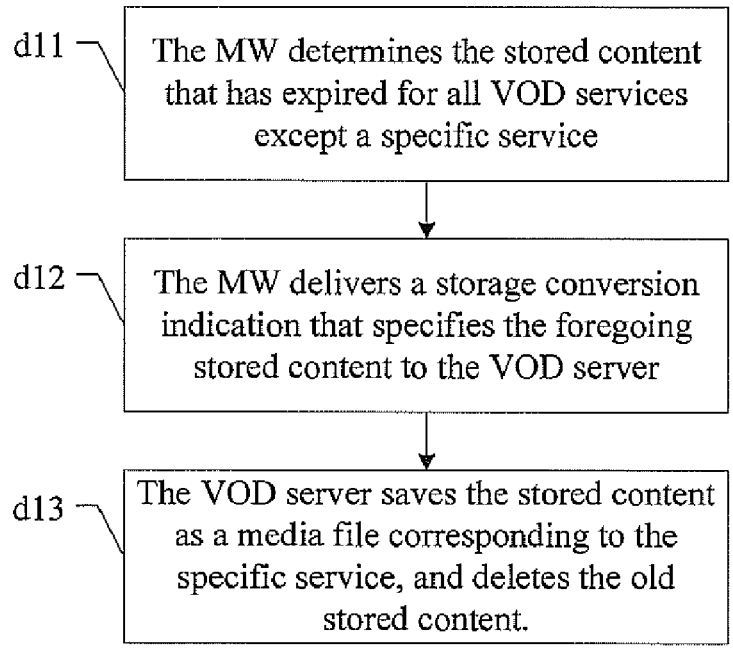
FIG. 5 shows a process of controlling and executing conversion of a stored content according to the third embodiment of the present disclosure.

In this embodiment, the storage control indications delivered by the MW not only include the indication for controlling storage addition and deletion, but also include a storage conversion indication. As shown in FIG. 5, the control and execution steps include:

d11. According to the retention period required by all VOD services correlated with the stored content of the channel, the MW determines the stored content which has expired for all VOD services except a specific service.

The "specific service" may be a service or a set of several services. This embodiment does not limit the "specific service", but a "specific service" is generally selected with reference to these features: (1) the service requires irregular retention periods in a relatively long time limit; and (2) the content correlated with this service is provided for a few specific groups such as specific users. Therefore, the nPVR service may be treated as a "specific service".

The process of determining whether the stored content expires is performed with reference to step b11 in the first embodiment. When recording the state of the EPG being invoked by various services, the MW may define a "specific service" separately, for example, for an nPVR service which invokes a specific EPG, the invocation does not vanish automatically with the elapse of time, the invocation goes on as long as the user subscribes to the nPVR program; if multiple users subscribe to the same nPVR program, the invocation goes on until the last user cancels the subscription.

d12. The MW delivers a storage conversion indication to the VOD server, where the indication specifies the stored content determined in the foregoing step.

The stored content may be specified with reference to step b12 in the first embodiment.

d13. The VOD server saves the stored content as a media file corresponding to the specific service according to the storage conversion indication, and deletes the original stored content.

Afterward, the user uses the specific service by using the saved independent media file as an object.

Embodiment 4

Figure 6:
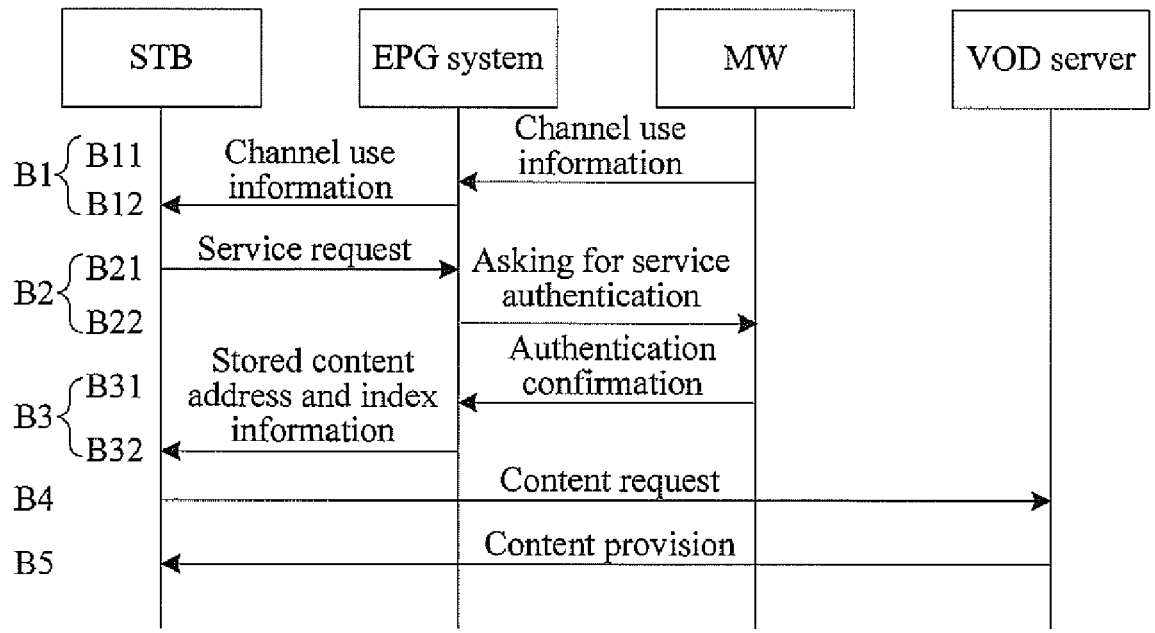
FIG. 6 is a flowchart of a method for providing VOD services according to the fourth embodiment of the present disclosure.

A method for providing VOD services. This method corresponds to the method for managing contents in a centralized manner manifested in the foregoing three embodiments. The content management and control are performed at the MW in a centralized manner. Therefore, in the process of service provision, the service packaging and release are also performed by the MW, and the VOD server provides the specific contents as required. As shown in FIG. 6, the process of this embodiment includes:

B1. The MW delivers the use information of the channel to the terminal, where the use information carries the VOD service information correlated with the channel; according to the structure of a general VOD service system, the MW may deliver the use information of the channel through an EPG system. Specifically, this step includes:

B11. The MW delivers the use information of the channel to the EPG system.

The objective of the MW delivering the use information of the channel is to enable the user to know the information about the channel, program, VOD service type, and VOD use mode, including:

EPG of the channel: the EPG information may include the program name, program introduction, start time and end time of the program, and poster of the program; and VOD service types available from the channel, for example, TSTV, TVOD, and nPVR;

VOD service use mode: if the channel provides the TSTV service, the time shifting window information (namely, the maximum time shift length supported by the channel) needs to be presented to the user; if the channel provides the TVOD service, the retention period of the recorded program needs to be presented to the user; if the channel provides the nPVR service, the maximum retention time of the personally recorded content needs to be presented to the user.

Additional information that may be presented to the user is: baud rate of recording the channel, format of the media file, and multiplier of the fast forward speed and fast rewind speed, with a view to showing the recording features of the channel file.

B12. The EPG system delivers the use information of the channel to the terminal such as an STB, and displays the use information to the user through a terminal interface.

For the channel that bears different services, the EPG may be displayed in different modes. For example, for a channel that bears the TVOD service, the EPG system displays the recorded channel EPG to the user; for the channel that bears the nPVR service, the EPG system displays the future channel EPG to the user; for a time-shifted channel, the EPG system displays the list of channels that provide time shifting and the current EPG information to the user.

B2. According to the use information of the channel, the terminal sends a service request correlated with a VOD service of the channel; similarly to step B1, the terminal may send the request through the EPG system. Specifically, this step includes:

B21. The terminal sends the service request to the EPG system.

B22. The EPG system asks the MW to authenticate the service request to be sure that the user is entitled to use the service.

B3. According to the service request, the MW exercises control to deliver the corresponding information to obtain the stored content to the terminal; similarly to step B1, the MW may reply to the request of the terminal through the EPG system. Specifically, this step includes:

B31. The MW performs service authentication according to the request of the EPG system, confirms the service request of the user according to the stored subscription relation of the user, and allocates transmission resources to the requested service. For example, in the case of Quadrature Amplitude Modulation (QAM), the MW allocates the QAM channel resources, and delivers the information required for watching the corresponding channel program contents. If the modulation is output through IP QAM, the MW may specify the QAM output frequency of the channel, and the address for the IP QAM device to receive the IP program streams of the VOD server. The IP QAM converts the IP program streams into coaxial cable signals. If the VOD server may output coaxial cable signals directly, ordinary QAM may be used instead, and the MW only needs to specify the QAM output frequency of the channel.

B32. The EPG system confirms the user's right of using the service according to the authentication result of the MW, and then returns the corresponding information to obtain the stored content to the terminal.

The purpose of the information to obtain the stored content is to enable the terminal to acquire the corresponding content from the VOD server according to such information. The information to obtain the stored content may carry a channel ID, start time, and end time. If the VOD server stores the file in the form of an EPG, the information to obtain the stored content may also carry a channel ID and an EPG.

B4. According to the information to obtain the stored content, the terminal sends a content request to the VOD server. The content request specifies the required stored content in a way understandable to the VOD server.

B5. The VOD server provides the stored content of the corresponding channel for the terminal according to the content request.

The method for providing services in this embodiment is a general process of providing VOD services, and is universally applicable to VOD services of different modes except for the difference of the specific service contents and expressions involved in the process. This embodiment reveals that the MW may package new services through flexible service definition modes, and technically facilitates the operator to develop diversified services.

The device and system disclosed in embodiments of the present disclosure are detailed below.

Embodiment 5

Figure 7:
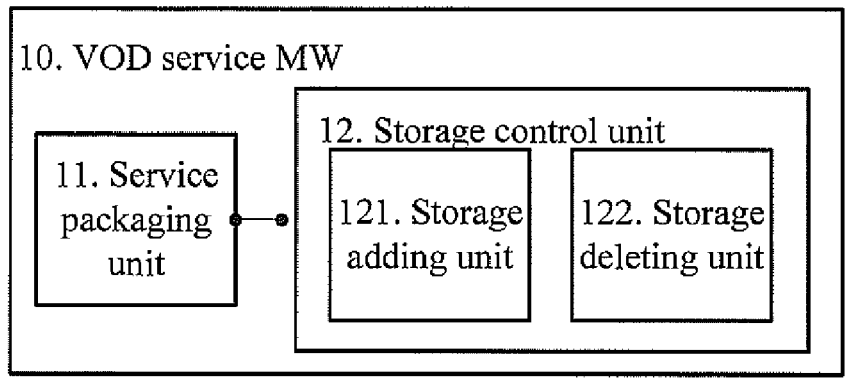
FIG. 7 shows a structure of a VOD service MW according to the fifth embodiment of the present disclosure.

As shown in FIG. 7, a VOD service MW 10 includes:

a service packaging unit 11, adapted to: define a VOD service, and correlate the VOD service information with a channel; and a storage control unit 12, adapted to: deliver the storage control indication of the channel to the VOD server according to the VOD service information correlated by the service packaging unit 11 for the channel. The storage control unit 12 further includes:

a storage adding unit 121, adapted to: determine the time segment of recording of the channel according to the union of the time segments of the contents required by all VOD services correlated with the channel; and deliver a storage addition indication that carries channel attributes and a time segment of recording to the VOD server; and a storage deleting unit 122, adapted to determine the stored content which has expired for all VOD services according to the retention period required for all VOD services correlated with the stored content of the channel; deliver a storage deletion indication to the VOD server, where the indication specifies the stored content which has expired for all VOD services.

The VOD service MW in this embodiment is applicable to the method for managing contents of VOD services in the first embodiment.

Embodiment 6

Figure 8:
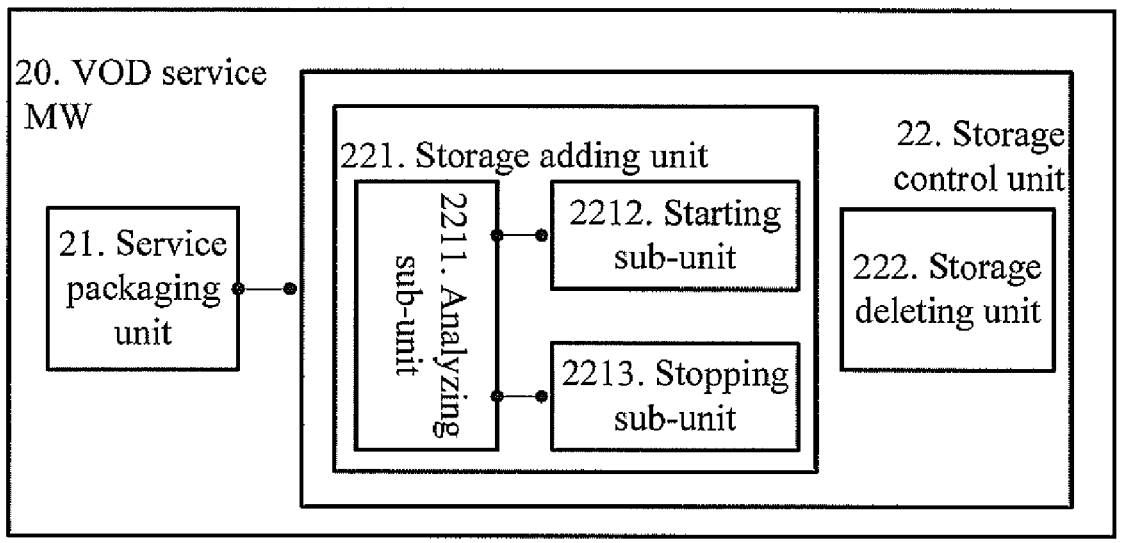
FIG. 8 shows a structure of a VOD service MW according to the sixth embodiment of the present disclosure.

As shown in FIG. 8, a VOD service MW 20 includes:

a service packaging unit 21, adapted to: define a VOD service, and correlate the VOD service information with a channel; and a storage control unit 22, adapted to: deliver the storage control indication of the channel to the VOD server according to the VOD service information correlated by the service packaging unit 21 for the channel.

The storage control unit 22 includes a storage adding unit 221 and a storage deleting unit 222.

The storage adding unit 221 includes an analyzing sub-unit 2211, a starting sub-unit 2212, and a stopping sub-unit 2213, where:

the analyzing sub-unit 2211 is adapted to determine the time segment of recording the channel according to the union of the time segments of the contents required by all VOD services correlated with the channel;

the starting sub-unit 2212 is adapted to deliver a recording start indication that carries channel attributes to the VOD server at the beginning of the time segment of recording determined by the analyzing sub-unit 2211; and the stopping sub-unit 2213 is adapted to deliver a recording stop indication that carries channel attributes to the VOD server at the end of the time segment of recording determined by the analyzing sub-unit 2211.

The storage deleting unit 222 is adapted to determine the stored content which has expired for all VOD services according to the retention period required for all VOD services correlated with the stored content of the channel; and deliver a storage deletion indication to the VOD server, where the indication specifies the stored content which has expired for all VOD services.

The VOD service MW in this embodiment is applicable to the method for providing contents of VOD services in the second embodiment.

Embodiment 7

Figure 9:
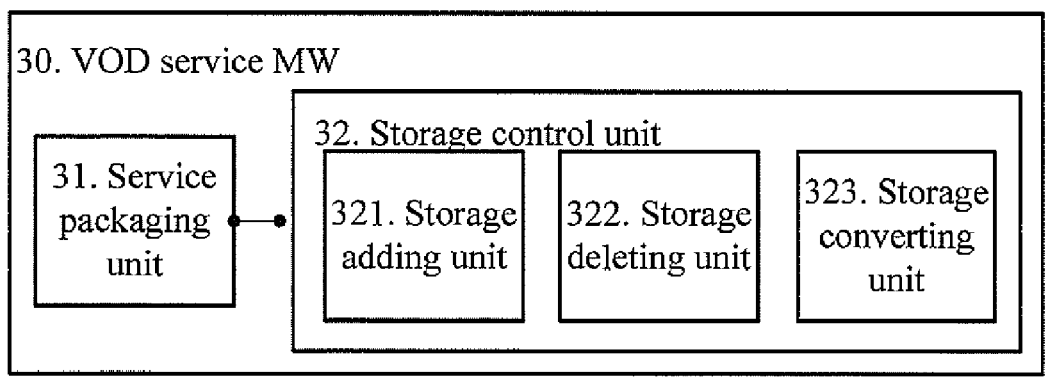
FIG. 9 shows a structure of a VOD service MW according to the seventh embodiment of the present disclosure.

As shown in FIG. 9, a VOD service MW 30 includes a service packaging unit 31 and a storage control unit 32.

The storage control unit 32 includes a storage adding unit 321, a storage deleting unit 322 and a storage converting unit 323; the service packaging unit 31, storage adding unit 321 and storage deleting unit 322 in this embodiment are in a structure identical with the service packaging unit 21, storage adding unit 221 and storage deleting unit 222 in the sixth embodiment, and are not repeated further.

The storage converting unit 323 is adapted to: determine a stored content which has expired for all VOD services except a specific service according to the retention period required for all VOD services correlated with the stored content of a channel; and deliver a storage conversion indication to the VOD server, where the indication specifies the stored content which has expired for all VOD services except the specific service.

The VOD service MW in this embodiment is applicable to the method for providing contents of VOD services in the third embodiment.

Embodiment 8

Figure 10:
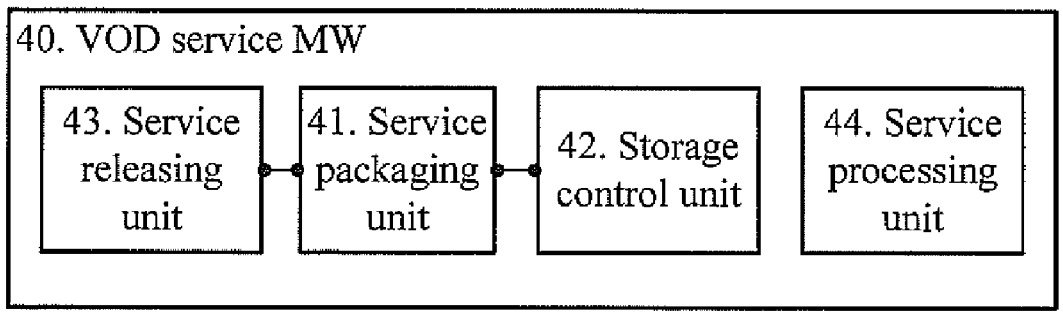
FIG. 10 shows a structure of a VOD service MW according to the eighth embodiment of the present disclosure.

As shown in FIG. 10, a VOD service MW 40 includes a service packaging unit 41, a storage control unit 42, a service releasing unit 43, and a service processing unit 44. The service packaging unit 41 and the storage control unit 42 in this embodiment are in a structure identical with the service packaging unit 31 and the storage control unit 32 in the seventh embodiment, and are not repeated further.

The service releasing unit 43 is adapted to deliver the use information of a channel, where the use information includes the VOD service information correlated by the service packaging unit 41 for the channel.

The service processing unit 44 is adapted to exercise control to deliver the corresponding information to obtain the stored content according to the service request correlated with a VOD service of the channel.

The VOD service MW in this embodiment is applicable to the method for providing VOD services in the fourth embodiment.

Embodiment 9

Figure 11:
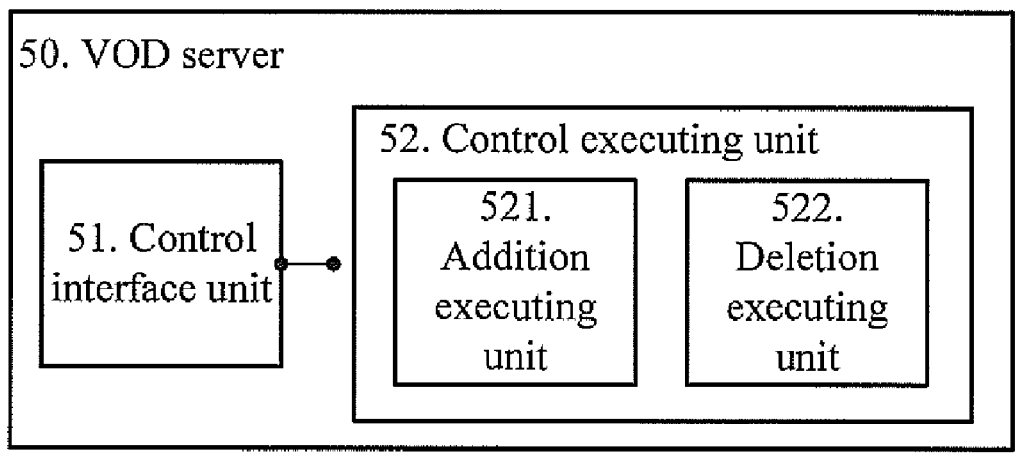
FIG. 11 shows a structure of a VOD server according to the ninth embodiment of the present disclosure.

As shown in FIG. 11, a VOD server 50 includes:

a control interface unit 51, adapted to receive a storage control indication delivered by the VOD service MW; and a control executing unit 52, adapted to add or perform operation on a stored content of a channel according to the storage control indication received by the control interface unit 51.

The storage control indication may include a storage addition indication that carries channel attributes and a time segment of recording, and a storage deletion indication that specifies the stored content.

The control executing unit 52 includes:

an addition executing unit 521, adapted to: acquire a media stream of the channel according to the channel attributes, and start and stop recording the media stream of the channel according to the time segment of recording; and a deletion executing unit 522, adapted to delete the corresponding stored content according to the storage deletion indication.

The VOD server in this embodiment is applicable to the method for providing contents of VOD services in the first embodiment.

Embodiment 10

Figure 12:
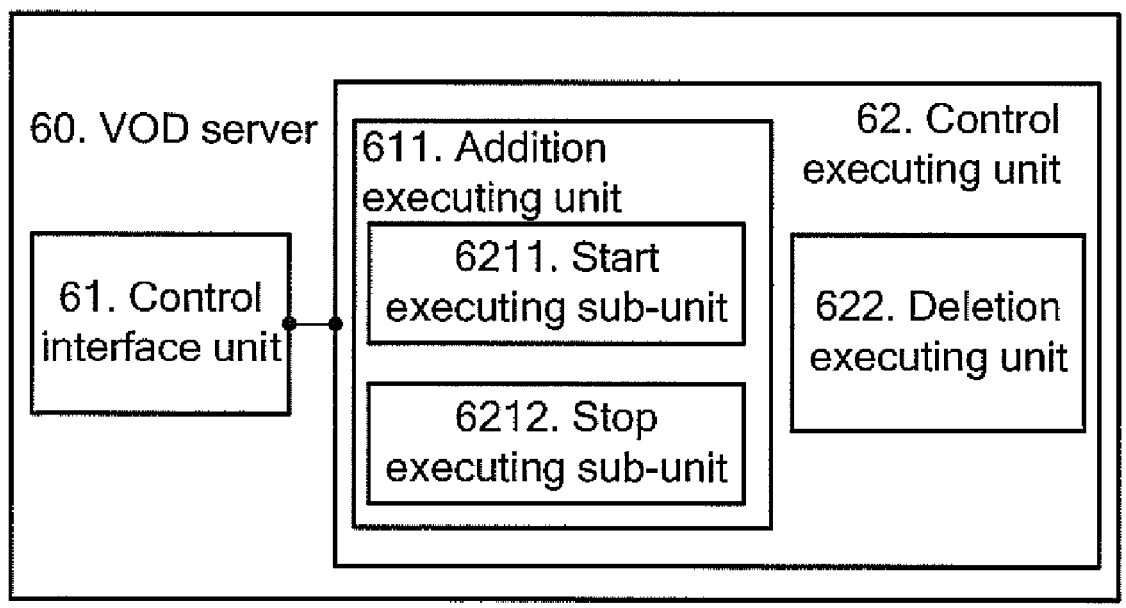
FIG. 12 shows a structure of a VOD server according to the tenth embodiment of the present disclosure.

As shown in FIG. 12, a VOD server 60 includes:

a control interface unit 61, adapted to receive a storage control indication delivered by the VOD service MW; and a control executing unit 62, adapted to add or perform operation on a stored content of a channel according to the storage control indication received by the control interface unit 61.

The storage control indication includes a recording start indication and a recording stop indication both carrying the channel attributes, and a storage deletion indication that specifies the stored content.

The control executing unit 62 includes an addition executing unit 621 and a deletion executing unit 622.

The addition executing unit 621 further includes:

a start executing sub-unit 6211, adapted to: acquire a media stream of the channel according to the channel attributes, and start recording the media stream of the channel according to the recording start indication; and a stop executing sub-unit 6212, adapted to stop recording the media stream of the channel according to the recording stop indication.

The deletion executing unit 622 is adapted to delete the corresponding stored content according to the storage deletion indication.

The VOD server in this embodiment is applicable to the method for providing contents of VOD services in the second embodiment.

Embodiment 11

Figure 13:
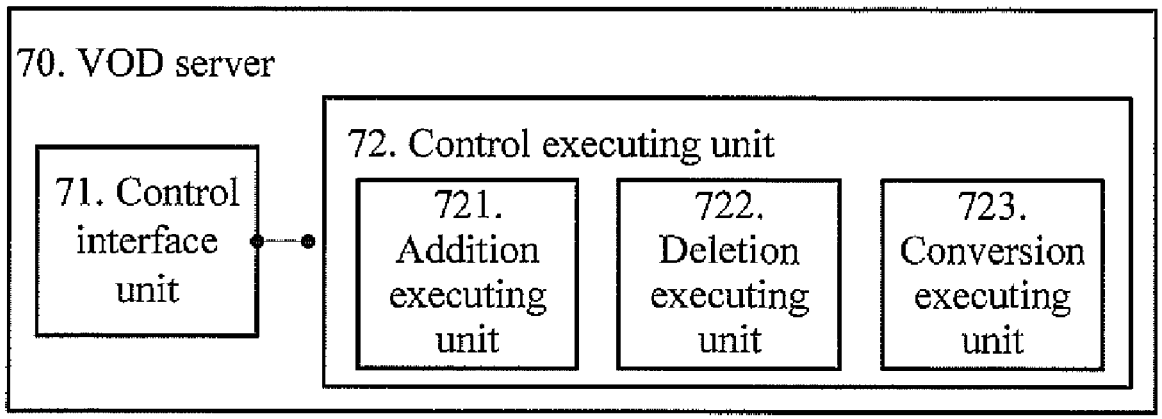
FIG. 13 shows a structure of a VOD server according to the eleventh embodiment of the present disclosure.

As shown in FIG. 13, a VOD server 70 includes a control interface unit 71 and a control executing unit 72.

The control executing unit 72 includes an addition executing unit 721, a deletion executing unit 722 and a conversion executing unit 723. The control interface unit 71, addition executing unit 721 and deletion executing unit 722 in this embodiment are in a structure identical with the control interface unit 61, addition executing unit 621 and deletion executing unit 622 in the tenth embodiment, and are not repeated further.

The conversion executing unit 723 is adapted to save a stored content as a media file corresponding to a specific service according to a storage conversion indication, and delete the original stored content.

The VOD server in this embodiment is applicable to the method for providing contents of VOD services in the third embodiment.

Embodiment 12

Figure 14:
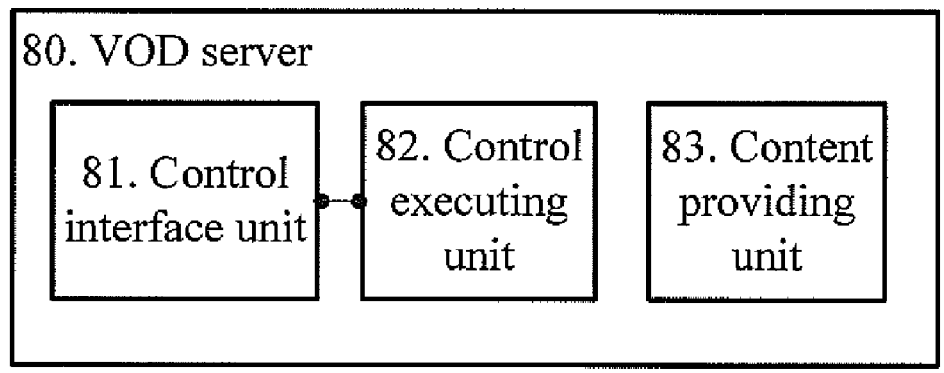
FIG. 14 shows a structure of a VOD server according to the twelfth embodiment of the present disclosure.
Figure 15:
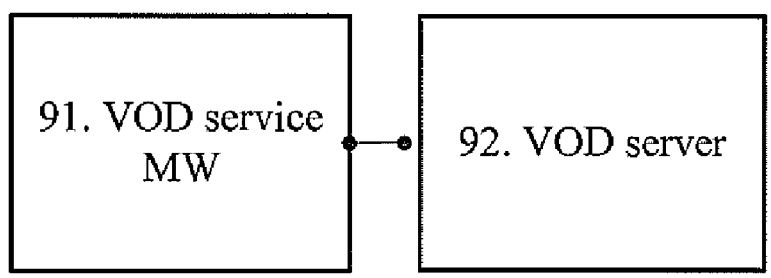
FIG. 15 shows a structure of a system for managing contents of VOD services according to the thirteenth embodiment of the present disclosure.
Figure 16:
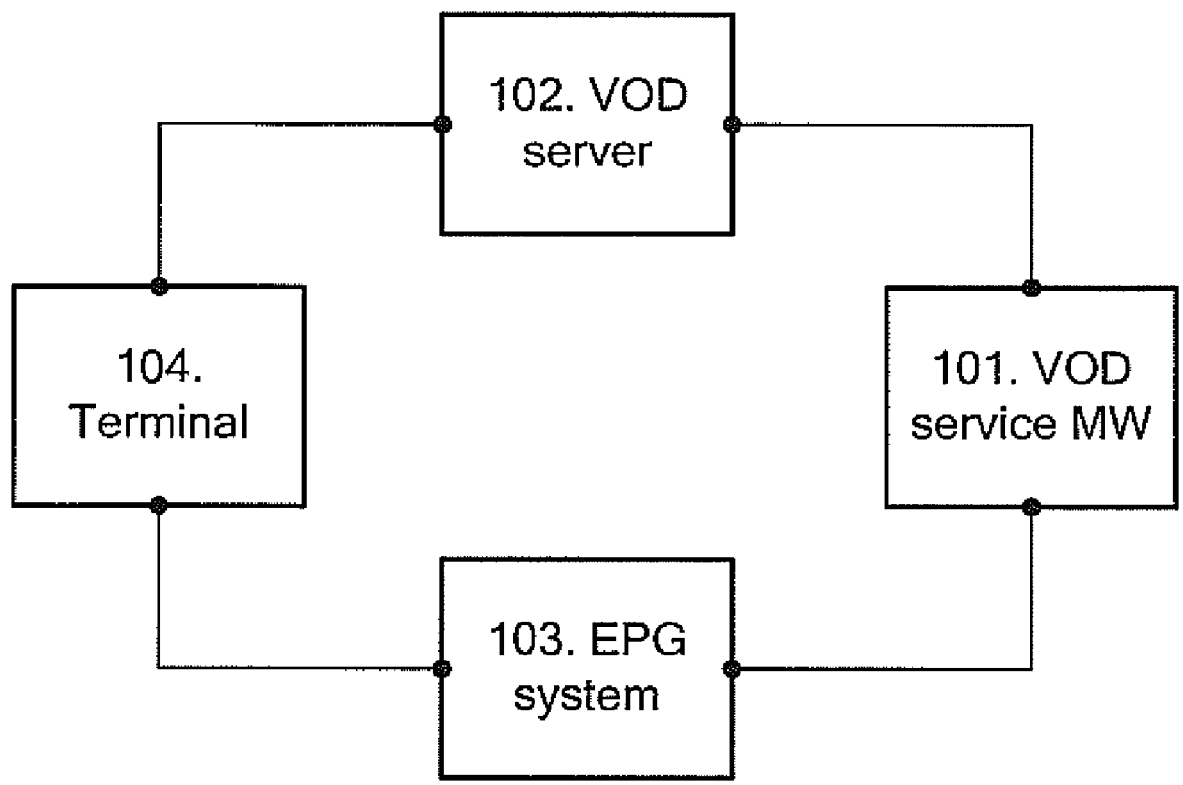
FIG. 16 shows a structure of a VOD service system according to the fourteenth embodiment of the present disclosure.

As shown in FIG. 14, a VOD server 80 includes a control interface unit 81, a control executing unit 82 and a content providing unit 83. The control interface unit 81 and control executing unit 82 in this embodiment are in a structure identical with the control interface unit 71 and the control executing unit 72 in the eleventh embodiment, and are not repeated further.

The content providing unit 83 is adapted to provide a stored content of a channel according to the content request that carries the information to obtain the stored content.

The VOD server in this embodiment is applicable to the method for providing VOD services in the fourth embodiment.

Embodiment 13

A system for managing contents of VOD services includes a VOD service MW 91 and a VOD server 92.

The VOD service MW 91 is adapted to deliver a storage control indication of a channel according to the VOD service information correlated with the channel.

The VOD server 92 is adapted to add or perform operation on a stored content of the channel according to the storage control indication delivered by the VOD service MW 91.

The system in this embodiment is applicable to the method for providing contents of VOD services in the first embodiment.

Embodiment 14

A VOD service system includes: a VOD service MW 101, a VOD server 102, an EPG system 103, and a terminal 104.

The VOD service MW 101 is adapted to: deliver a storage control indication of a channel to the VOD server 102 according to the VOD service information correlated with the channel; deliver the channel use information that carries the VOD service information correlated with the channel to the EPG system 103; and perform service authentication according to the request of the EPG system 103 and allocate transmission resources to the service.

The VOD server 102 is adapted to add or perform operation on a stored content of the channel according to the storage control indication; and provide the stored content of the corresponding channel for the terminal 104 according to the content request sent by the terminal 104.

The EPG system 103 is adapted to deliver the use information of the channel to the terminal 104; ask the MW 101 to authenticate the service request sent by the terminal 104; and return the corresponding information to obtain the stored content to the terminal 104 according to the authentication confirmation of the MW 101.

The terminal 104 is adapted to send a service request correlated with a VOD service of the channel to the EPG system 103 according to the use information of the channel; and send a content request to the VOD server 102 according to the information to obtain the stored content.

The system in this embodiment is applicable to the method for providing VOD services in the fourth embodiment.

In the embodiments of the present disclosure, the MW controls stored contents for the VOD server according to the VOD service information correlated with a channel. Therefore, the specific service forms are separated from the stored contents, and the MW controls the contents in a centralized manner according to the service information; the VOD server does not need to store the contents of each service separately, but only needs to add and delete the stored contents according to the unified control from the MW, thus avoiding repeated storage of the same data for different services. Moreover, the VOD server does not reflect the service difference through the content storage, and does not need to support the specific service forms, thus simplifying the requirements on the VOD server and reducing the equipment cost. Besides, the service is separated from content storage. Therefore, the MW may perform service packaging flexibly. Operators may make the best of the stored contents and develop new diversified services by adjusting the storage time and changing the service provision mode.

The above is a detailed description of a method for managing contents of VOD services, the corresponding method for providing VOD services, and the relevant devices and systems. Although the present disclosure has been described through some exemplary embodiments, the disclosure is not necessarily limited to such embodiments. It is apparent that those skilled in the art can make various modifications and variations to the embodiments without departing from the spirit and scope of the disclosure. The disclosure is intended to cover the modifications and variations of the embodiments provided that they fall in the scope of protection defined by the following claims or their equivalents.

What is claimed is:

1. A method for managing contents of Video On Demand (VOD) services, comprising:
   delivering, by a Middle Ware (MW), a storage control indication of a channel to a VOD server according to VOD service information correlated with the channel, wherein the VOD service information correlated with the channel comprises information of multiple VOD services; storing, by the VOD server, content of the channel corresponding to multiple VOD services in a uniform way according to the storage control indication, or, performing an operation, by the VOD server, on a stored content of the channel according to the storage control indication, wherein the stored content of the channel are available to the multiple VOD services.

2. The method for managing contents of VOD services according to claim 1, wherein the storage control indication comprises a storage addition indication;
   the process of delivering the storage control indication of the channel to the VOD server according to VOD service information correlated with the channel comprises:
   determining, by the MW, a time segment of recording the channel according to a union of time segments of contents required by all VOD services correlated with the channel; and
   delivering, by the MW, the storage addition indication to the VOD server, wherein the indication carries channel attributes and the time segment of recording; and
   wherein the process of storing content of the channel corresponding to multiple VOD services in a uniform way according to the storage control indication comprises:
   by the VOD server, acquiring a media stream of the channel according to the channel attributes, and starting and stopping recording the media stream of the channel according to the time segment of recording, wherein the recorded media stream are saved as content of channel corresponding to multiple VOD services in a uniform way.

3. The method for managing contents of VOD services according to claim 2, wherein the channel attributes comprises channel ID and media attributes; wherein the step of starting and stopping recording the media stream of the channel according to the time segment of recording comprises:
   starting and stopping recording the media stream of the channel indicated by the channel ID and saving the recorded media stream according to the media attributes.

4. The method for managing contents of VOD services according to claim 1, wherein the storage control indication comprises a storage deletion indication;
   the process of delivering the storage control indication of the channel to the VOD server according to VOD service information correlated with the channel comprises:
   determining, by the MW, a stored content which has expired for all VOD services according to a retention period required by all VOD services correlated with the stored content of the channel; and
   delivering, by the MW, the storage deletion indication to the VOD server, where the indication specifies the stored content determined in the foregoing step;
   performing operation on a stored content of the channel according to the storage control indication comprises:
   deleting, by the VOD server, the corresponding stored content according to the storage deletion indication.

5. The method for managing contents of VOD services according to claim 1 wherein the storage control indication comprises a storage conversion indication;
   the process of delivering the storage control indication of the channel to the VOD server according to VOD service information correlated with the channel comprises:
   determining, by the MW, the stored content which has expired for all VOD services except a specific service according to the retention period required by all VOD services correlated with the stored content of the channel; and
   delivering, by the MW, the storage conversion indication to the VOD server, where the storage conversion indication specifies the stored content which has expired for all VOD services except a specific service and determined by the MW;
   the process of performing operation on the stored content of the channel according to the storage control indication comprises:
   by the VOD server, saving the stored content which specified by the storage conversion indication as a media file corresponding to the specific service according to the storage conversion indication, and deleting the original stored content.

6. The method for managing contents of VOD services according to claim 2, wherein after the process of delivering the storage control indication of the channel to the VOD server, the method further comprises:
   delivering, by the Middle Ware (MW), use information of the channel to a terminal, wherein the use information carries the VOD service information correlated with the channel;
   by the MW, receiving a service request correlated with a VOD service of the channel initiated by the terminal according to the use information of the channel, and exercising control to deliver corresponding information to obtain the stored content to the terminal according to the service request; and,
   by a VOD server, receiving a content request initiated by the terminal according to the corresponding information to obtain the stored content, and providing a stored content of the corresponding channel for the terminal according to the content request.

7. The method for providing VOD services according to claim 6, wherein the MW delivers the use information of the channel to the terminal through an Electronic Program Guide (EPG) system, and wherein the VOD service information correlated with the channel comprises EPG of the channel and VOD service types available from the channel and VOD service use mode.

8. The method for providing VOD services according to claim 7, wherein the VOD service use mode comprising the time shifting window information when the VOD service type is TSTV, and
   the VOD service use mode comprising the retention period of the recorded program when the VOD service type is TVOD; and
   the VOD service use mode comprising the maximum retention time of the personally recorded content when the VOD service is nPVR.

9. The method for providing VOD services according to claim 8, wherein the EPG system displays the list of channels that provide time shifting and the current EPG information to the user when the VOD service type is TSTV, the EPG system displays the recorded channel EPG to the user when the VOD service type is TVOD; and the EPG system displays the future channel EPG to the user when the VOD service is nPVR.

10. The method for providing VOD services according to claim 6, wherein: the process of the MW receiving a service request correlated with a VOD service of the channel initiated by the terminal comprises:

receiving, by the EPG system, the service request from the terminal; and requesting, by the EPG system, the MW to authenticate the service request;

the process of the MW exercising control to deliver the corresponding information to obtain the stored content to the terminal according to the service request comprises:

performing, by the MW, service authentication according to the request of the EPG system, and allocating transmission resources to the service; and returning, by the EPG system, the corresponding information to obtain the stored content to the terminal according to authentication confirmation from the MW.

11. A Video On Demand (VOD) service Middle Ware (MW) stored on a computer readable medium and executable by a processor, comprising:

a service packaging unit, adapted to define a VOD service, and correlate VOD service information with a channel; and a storage control unit, adapted to deliver a storage control indication of the channel to a VOD server according to the VOD service information correlated by the service packaging unit for the channel, wherein the VOD service information correlated with the channel comprises information of multiple VOD services, so that the VOD server stores content of the channel corresponding to multiple VOD services in a uniform way according to the storage control indication, or, performs an operation on a stored content of the channel according to the storage control indication, wherein the stored content of the channel are available to the multiple VOD services.

12. The VOD service MW of claim 11, wherein the storage control unit further comprises:

a storage adding unit, adapted to determine a time segment of recording of the channel according to a union of time segments of contents required by all VOD services correlated with the channel; and deliver a storage addition indication that carries channel attributes and the time segment of recording to the VOD server; and a storage deleting unit, adapted to determine a stored content which has expired for all VOD services according to a retention period required for all VOD services correlated with the stored content of the channel; and deliver a storage deletion indication to the VOD server, where the indication specifies the stored content which has expired for all VOD services.

13. The VOD service MW of claim 11, wherein the storage control unit further comprises:

a storage adding unit, comprising an analyzing sub-unit adapted to determine a time segment of recording of the channel according to a union of time segments of contents required by all VOD services correlated with the channel; a starting sub-unit adapted to deliver a recording start indication that carries channel attributes to the VOD server at the beginning of the time segment of recording; and a stopping sub-unit adapted to deliver a recording stop indication that carries channel attributes to the VOD server at the end of the time segment of recording; and a storage deleting unit, adapted to determine a stored content which has expired for all VOD services according to a retention period required for all VOD services correlated with the stored content of the channel and deliver a storage deletion indication to the VOD server, wherein the indication specifies the stored content which has expired for all VOD services.

14. The VOD service MW of claim 12, wherein the storage control indication further comprises a storage conversion indication; and the storage control unit further comprises:

a storage converting unit, adapted to: determine the stored content which has expired for all VOD services except a specific service according to the retention period required for all VOD services correlated with the stored content of the channel; and deliver a storage conversion indication to the VOD server, wherein the indication specifies the stored content which has expired for all VOD services except the specific service, so that the VOD server saves the stored content which specified by the storage conversion indication as a media file corresponding to the specific service according to the storage conversion indication, and deletes the original stored content.

15. The VOD service MW according to claim 11, further comprising:

a service releasing unit, adapted to deliver use information of the channel, where the use information comprises the VOD service information correlated by the service packaging unit for the channel, wherein the VOD service information correlated with the channel comprises EPG of the channel and VOD service types available from the channel and VOD service use mode; and a service processing unit, adapted to exercise control to deliver the corresponding information to obtain the stored content according to the service request correlated with a VOD service of the channel.

16. A system for managing contents of Video On Demand (VOD) services, comprising:

a VOD service Middle Ware (MW) stored on a computer readable medium and executable by a processor, adapted to deliver a storage control indication of a channel according to VOD service information correlated with the channel, wherein the VOD service information correlated with the channel comprises information of multiple VOD services; and a VOD server, adapted to store content of the channel corresponding to multiple VOD services in a uniform way according to the storage control indication or perform an operation on a stored content of the channel according to the storage control indication, wherein the stored content of the channel according to the storage control indication are available to the multiple VOD services.

17. The system according to claim 16, when the storage control indication comprises a storage addition indication that carries channel attributes and a time segment of recording, and a storage deletion indication that specifies the stored content, the VOD server, comprising a control interface unit, a control executing unit and the control executing unit comprises an addition executing unit and a deletion executing unit; wherein the control interface unit is adapted to receive a storage control indication delivered by a VOD service Middle Ware (MW); and the addition executing unit is adapted to acquire a media stream of the channel according to the channel attributes, and start and stop recording the media stream of the channel according to the time segment of recording, wherein the recorded media stream are saved as content of channel corresponding to multiple VOD services in a uniform way; and the deletion executing unit is adapted to delete the corresponding stored content according to the storage deletion indication.

18. The system of claim 17, wherein when the storage control indication further comprises a storage conversion indication that specifies the stored content, the control executing unit further comprises:

a conversion executing unit, adapted to: save the stored content as a media file corresponding to a specific service according to the storage conversion indication, and delete the original stored content.

19. The system according to claim 16, further comprising an Electronic Program Guide (EPG) system, wherein the VOD service MW is further adapted to deliver channel use information that carries the VOD service information correlated with the channel to the EPG system; and perform service authentication according to a request of the EPG system and allocate transmission resources to the service;

the VOD server is further adapted to provide the stored content of the corresponding channel for a terminal according to a content request that is sent by the terminal and carries information to obtain the stored content; and the EPG system is adapted to deliver use information of the channel to the terminal; request the MW to authenticate a service request that is sent by the terminal and correlated with a VOD service of the channel; and return the corresponding information to obtain the stored content to the terminal according to authentication confirmation from the MW.

20. The system according to claim 19, wherein the VOD service information correlated with the channel comprises EPG of the channel and VOD service types available from the channel and VOD service use mode.

* * * * *